US010195987B2

(12) United States Patent
Berlitz et al.

(10) Patent No.: US 10,195,987 B2
(45) Date of Patent: Feb. 5, 2019

(54) MOTOR VEHICLE HAVING INTERIOR LIGHTING DEVICE(S) FOR EMITTING MOVING LIGHT

(71) Applicant: Audi AG, Ingolstadt (DE)

(72) Inventors: Stephan Berlitz, Schrobenhausen (DE); Friedrich-Uwe Tontsch, Ingolstadt (DE); Julia Kastner, Beilngries (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/779,467

(22) PCT Filed: Nov. 24, 2016

(86) PCT No.: PCT/EP2016/078713
§ 371 (c)(1),
(2) Date: May 25, 2018

(87) PCT Pub. No.: WO2017/089484
PCT Pub. Date: Jun. 1, 2017

(65) Prior Publication Data
US 2018/0257558 A1 Sep. 13, 2018

(30) Foreign Application Priority Data
Nov. 25, 2015 (DE) .................. 10 2015 015 235

(51) Int. Cl.
*B60Q 3/80* (2017.01)
*B60Q 3/18* (2017.01)
(Continued)

(52) U.S. Cl.
CPC .................. *B60Q 3/80* (2017.02); *B60Q 3/18* (2017.02); *B60Q 3/217* (2017.02); *B60Q 3/54* (2017.02);
(Continued)

(58) Field of Classification Search
None
See application file for complete search history.

(56) References Cited

U.S. PATENT DOCUMENTS 6,037,865 A 3/2000 Heinz et al.
2008/0040004 A1* 2/2008 Breed ................. B60R 21/0134
701/45

(Continued)

FOREIGN PATENT DOCUMENTS

DE 19745993 A1 4/1999
DE 10130259 A1 1/2003
(Continued)

OTHER PUBLICATIONS

International Preliminary Report on Patentability directed to related International Patent Application No. PCT/EP2016/078713, dated May 31, 2018, with attached English-language translation; 21 pages.

(Continued)

Primary Examiner — Crystal L Hammond
(74) Attorney, Agent, or Firm — Sterne, Kessler, Goldstein & Fox P.L.L.C.

(57) ABSTRACT

The disclosure relates to a motor vehicle having one or more flashing light devices for generating a turn signal light or a blinking hazard light, one or more elongated interior lighting devices for emitting visible light in a form of moving light in the interior of the motor vehicle, and a control device associated with the interior lighting devices, and the control device is configured to to control the one or more interior lighting devices such that, during the time the turn signal light or the blinking hazard light is being generated by the one or more flashing light devices, visible light in the form of a moving light will be emitted by the one or more interior lighting devices.

20 Claims, 1 Drawing Sheet

(51) Int. Cl.
*B60Q 9/00* (2006.01)
*B60Q 3/78* (2017.01)
*B60Q 3/54* (2017.01)
*B60Q 3/217* (2017.01)
*B60Q 1/34* (2006.01)
*B60Q 1/46* (2006.01)

(52) U.S. Cl.
CPC ............... *B60Q 3/78* (2017.02); *B60Q 9/00* (2013.01); *B60Q 1/34* (2013.01); *B60Q 1/46* (2013.01)

(56) References Cited

U.S. PATENT DOCUMENTS

| | | | |
|---|---|---|---|
| 2010/0295670 A1* | 11/2010 | Sato | B60Q 9/00 340/458 |
| 2013/0127340 A1 | 5/2013 | Huhn et al. | |
| 2013/0127612 A1 | 5/2013 | Stadler et al. | |
| 2013/0222212 A1* | 8/2013 | Lorenz | B60K 35/00 345/7 |
| 2014/0002255 A1 | 1/2014 | Reuschel et al. | |
| 2016/0152163 A1* | 6/2016 | Strasdat | B60R 7/04 296/64 |
| 2016/0185279 A1* | 6/2016 | Zagorski | B60Q 1/34 701/36 |
| 2016/0185387 A1* | 6/2016 | Kuoch | B60K 35/00 701/41 |
| 2016/0250963 A1 | 9/2016 | Reuschel et al. | |
| 2016/0343254 A1* | 11/2016 | Rovik | B60Q 9/00 |
| 2016/0355179 A1* | 12/2016 | Cannella | B60T 7/22 |
| 2016/0375911 A1* | 12/2016 | Coelingh | B60W 50/0205 701/23 |

FOREIGN PATENT DOCUMENTS

| | | |
|---|---|---|
| DE | 102006009636 A1 | 9/2007 |
| DE | 202010004702 U1 | 7/2010 |
| DE | 102010018336 A1 | 1/2012 |
| DE | 102011014263 A1 | 9/2012 |
| DE | 102011119231 A1 | 5/2013 |
| DE | 102011119230 B4 | 7/2013 |
| DE | 102012009338 A1 | 11/2013 |
| DE | 102012106472 A1 | 1/2014 |
| DE | 102013200441 B3 | 5/2014 |
| DE | 102013101198 A1 | 7/2014 |
| DE | 102013012779 A1 | 2/2015 |
| WO | WO 2015067353 A2 | 5/2015 |

OTHER PUBLICATIONS

English-Language abstract of German Patent Application Publication No. DE 10130259 A1, published Jan. 9, 2013; 1 page.
English-Language abstract of German Patent Application Publication No. DE 102006009636 A1, published Sep. 6, 2007; 1 page.
English-Language abstract of German Patent Application Publication No. DE 202010004702 U1, published Jul. 29, 2010; 1 page.
English-Language abstract of German Patent Application Publication No. DE 102010018336 A1, published Jan. 19, 2012; 1 page.
English-Language abstract of German Patent Application Publication No. DE 102012009338 A1, published Nov. 14, 2013; 1 page.
English-Language abstract of German Patent Application Publication No. DE 102012106472 A1, published Jan. 23, 2014; 1 page.
English-Language abstract of German Patent Application Publication No. DE 102013200441 B3, published May 22, 2014; 1 page.
English-Language abstract of German Patent Application Publication No. DE 102013101198 A1, published Jul. 31, 2014; 1 page.
International Search Report and Written Opinion of the International Searching Authority directed to related International Patent Application No. PCT/EP2016/078713, with attached English-language translation, dated Feb. 3, 2017; 26 pages.

* cited by examiner

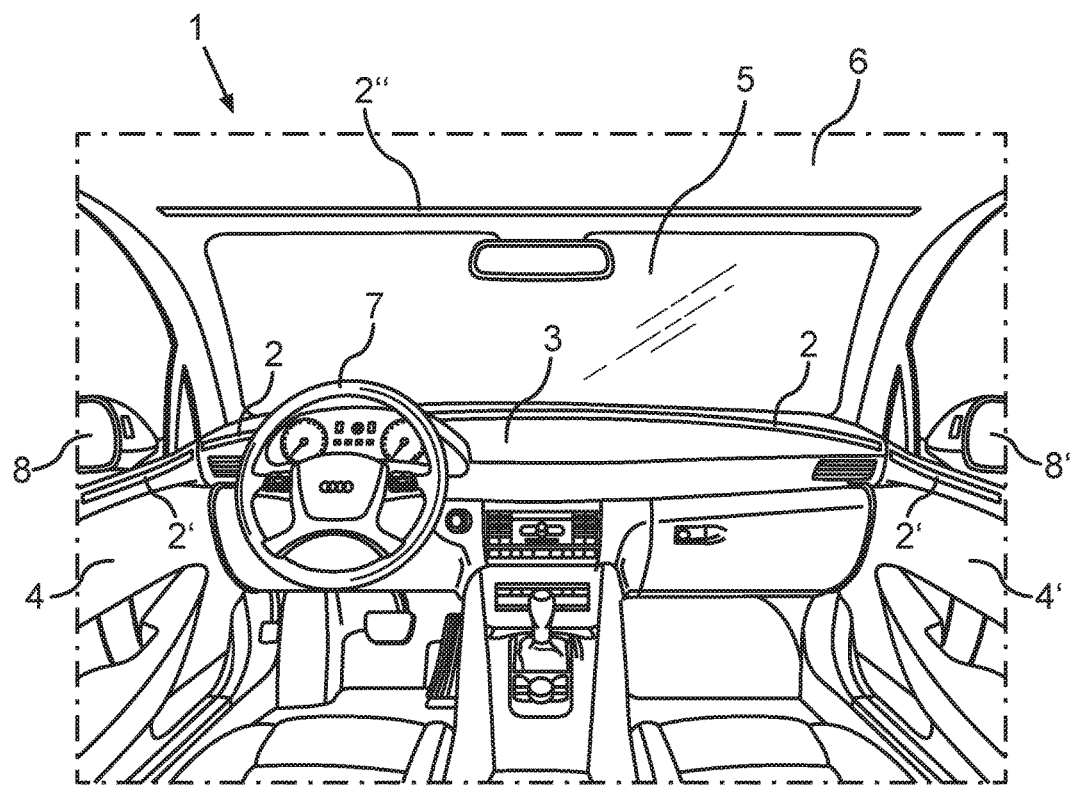

MOTOR VEHICLE HAVING INTERIOR LIGHTING DEVICE(S) FOR EMITTING MOVING LIGHT

TECHNICAL FIELD

The present invention relates to a motor vehicle having interior lighting device(s) used to emit a moving light and a method for producing a moving light in the interior of a motor vehicle.

BACKGROUND

Electrical illumination devices which can be used to produce a so-called moving light effect have been known for some time. In illumination devices of this sort, for example, each of the light sources in a sequence of adjacent light sources can briefly assume an illuminated condition one after the other in one direction, thus giving the impression that the light source itself is moving. Another kind of moving light effect can be achieved by each of the light sources in a sequence of adjacent light sources assuming an illuminated condition one after the other in one direction until the last of the light sources in the sequence has also assumed an illuminated condition. All of the light sources can subsequently be switched off simultaneously, and the aforementioned process can either be repeated or the light sources can be switched off in reverse order. As a result, a moving light is created, the maximum illuminated duration of which is determined by the duration of the illumination in the sequence of adjacent light sources. However, these and other moving light effects are also able to be realized using other technical principles, for example using electromechanical means such as motor-driven drums or using electronic means such as microprocessors.

Moving lights have a high level of noticeability because objects that appear to be moving are more readily perceived by people than is the case with stationary objects. Illumination devices having a moving light effect are used, for example, in advertising, the entertainment industry, and in areas requiring particular attention, such as in warning systems.

Lighting devices for producing a moving light effect and the use thereof are—in addition to the aforementioned kinds of use—also known from the field of motor vehicle technology.

DE 101 30 259 A1 thus describes a method for controlling at least one moving light, which is suitable for indicating a change in travel direction and/or the driving situation of vehicles (blinking hazard lights in particular). The blinking indicator light is divided into columns which alternately assume "on" and "off" conditions. In particular, a method for indicating the driving situation is proposed in which the blinking indicator light is divided into rows, thus enabling a moving light display running from top to bottom or vice versa to be realized. The known blinking hazard lights can be realized using the aforementioned method. It can furthermore be used to signal acceleration situations, for example the resumption of travel after a breakdown.

Known from DE 10 2011 119 230 B4 are blinking motor vehicle indicator lights which emphasize, by means of a moving light effect, the direction of travel that is being signaled. Operated for this purpose are blinking LED lights, the blinking cycle of which begins with all LED groups in the blinking indicator light in an off condition, after which, beginning with an initial group, the remaining LED groups are successively switched on until all of the LED groups have been switched on, followed by all of the LED groups remaining in an on condition for a predetermined duration and, finally, all of the LED groups being switched off. In this context, the duration from activation of the initial group until all LED groups reaching an on condition is in the range of from 100 ms to 200 ms.

In addition, the subject-matter of DE 10 2013 101 190 A1 is an illumination device for vehicles having a moving light means comprising multiple LED light sources, a light guide unit associated with the LED light sources, and a control unit for controlling the LED light sources. A variable output of luminous flux is thus capable of being generated in the direction of sweep, whereby the light guide unit comprises a light guide, which has light coupling surfaces at both opposite ends for coupling light as well as surfaces adjoining the light coupling surfaces where light can be completely reflected and further conducted in the direction the light travels, and the decoupling elements comprise a front side, toward which the decoupling elements divert the light, and which serves as a light decoupling surface where the light is able to be decoupled in the main direction of emission. The LED light sources are arranged and controllable with respect to the light guide such that, in a first light sweep stage, a light beam only for illuminating a rear side of the light guide and/or a light beam for illuminating the rear side of the light guide as well as for illuminating the first light coupling surface is provided, and such that, in a further light sweep stage, the light beam for illuminating the rear side of the light guide and the first light coupling surface and/or an additional light beam are provided exclusively for coupling at the first light coupling surface, and such that, in a further light sweep stage, a light beam for coupling at the second light coupling surface of the light guide is provided.

BRIEF DESCRIPTION OF DRAWINGS/FIGURES

FIG. 1 shows a schematic and illustrative view of a portion of the motor vehicle interior according to embodiments of the present invention.

DETAILED DESCRIPTION

The object of the present invention is to provide the advantageous properties of a moving light in the interior of a motor vehicle in a novel and surprising manner. A further object of the present invention is to provide a novel method for using a moving light in a motor vehicle. These objects will be achieved by embodiments of the motor vehicle and the method described herein. Preferential refinements and embodiments of the motor vehicle are the subject-matter of the dependent claims.

Proposed according to the invention is a motor vehicle having one or more flashing light devices for generating a turn signal light or generating a blinking hazard light, one or more elongated interior lighting device(s) for emitting visible light in the interior of the motor vehicle, and a control device associated with the interior lighting device(s) for controlling the interior lighting device(s).

The motor vehicle according to embodiments of the invention is characterized in that the one or more interior lighting device(s) is/are configured to be able to emit visible light in the form of a moving light, and the control device is configured to detect the generation of a turn signal light or the generation of a blinking hazard light by the one or more flashing light devices, and to control the one or more interior lighting device(s) in such a way that the one or more interior lighting device(s) will emit visible light in the form of a moving light during the time the turn signal light or the blinking hazard light is being generated by the one or more flashing light devices.

By means of the invention, the high level of noticeability associated with moving lights is provided in the interior of a motor vehicle. The present invention takes advantage of a human psychological trait (that of apparently moving objects being more readily perceived by them than stationary objects) and uses it in a particularly advantageous way.

According to a first preferential refinement of the invention, the motor vehicle further comprises device for autonomously driving the motor vehicle, and the control device is configured such that, during the time a turn signal light or a blinking hazard light is being generated by the one or more flashing light devices, the one or more interior lighting device(s) will be controlled in such a way as to emit visible light in the form of a moving light only when the motor vehicle is being driven in an autonomous mode.

When the motor vehicle is being autonomously (automatically) driven, the driver is relieved of the operator actions traditionally necessary for driving a motor vehicle (according to the regulations valid at this time, however, the driver must be able to take control of the motor vehicle at all times).

By virtue of the motor vehicle being driven autonomously, for example, no instructions regarding the direction of travel are provided to the driver by the navigation system, and no actions are undertaken by the driver in preparing for and executing such changes. On the contrary, during autonomous driving the motor vehicle can, for example, drive toward a destination which has been entered into the navigation system at the beginning of or during the trip, and procedures like changing lanes and making turns are prepared for and executed autonomously.

Given the often unforeseeable or unexpected responses by the motor vehicle, this can lead to feelings of uncertainty or even uneasiness on the part of the occupants of the autonomously driven motor vehicle. As a result, it is especially advantageous precisely in an autonomously driven motor vehicle in this context making anticipated changes in the direction of travel (lane changes or turns) during which a turn signal light is switched on or during problems (connected with or apart from the vehicle) due to which the blinking hazard light is autonomously switched on for this to be made apparent to the motor vehicle occupants by using an easily perceptible optical signal in the vehicle interior such as that provided according to the present invention.

According to a second preferential refinement of the motor vehicle, the one or more interior lighting device(s) is/are configured to be able to emit a moving light having at least a yellow and/or a red color.

It is expected in many countries that a turn signal light will be yellow in color but, in some countries, a turn signal light is also allowed to be red in color. Since, generally speaking, the same flashing light devices that are used for the turn signal light are also used for a blinking hazard light, a blinking hazard light can likewise be yellow or red in color. As a consequence, it is advantageous for the interior lighting device(s) to be configured to be able to emit a moving light having a yellow and/or a red color since doing so enables the exact color of light being created by the turn signal light or the blinking hazard light or a similar color of light to also be created by the interior lighting device(s).

According to a third preferential refinement of the motor vehicle, the one or more interior lighting device(s) are arranged in the area of the dashboard, the inside of the driver's door and the passenger's door, and/or the interior roof of the motor vehicle where it joins the windshield.

Advantageously, it can in this context be provided that the control device is additionally configured such that, during the time a turn signal light is being generated by the one or more flashing light devices, the one or more interior lighting device(s) will be controlled in such a way that a moving light is generated in the area of the motor vehicle's dashboard which starts in the area behind the steering control element (steering wheel) or in the area of the median longitudinal plane of the motor vehicle and sweeps toward the side of the motor vehicle where the turn signal light is being generated, a moving light is generated in the interior roof area of the motor vehicle which starts in the area of the median longitudinal plane of the motor vehicle and sweeps toward the side of the vehicle where the turn signal light is being generated, and/or a moving light is generated in the area of the driver's door or the passenger's door such that the moving light is generated in the area of the door located on the side of the motor vehicle where the turn signal light is being generated, and the moving light begins on the end of the interior lighting device facing the front of the motor vehicle and sweeps toward the end of the interior lighting device facing the rear of the motor vehicle.

Likewise, it can be provided for the control device in the motor vehicle to be configured such that, during the time a turn signal light is being generated by the one or more flashing light devices, the one or more interior lighting device(s) will be controlled in such a way that a moving light is generated in the area of the motor vehicle's dashboard which starts in the area behind the steering control element (steering wheel) or in the area of the median longitudinal plane of the motor vehicle and sweeps toward the side of the motor vehicle where the turn signal light is being generated, and a moving light is generated in the area of the driver's door or the passenger's door such that the moving light is generated in the area of the door located on the side of the motor vehicle where the turn signal light is being generated, and the moving light begins on the end of the interior lighting device facing the front of the motor vehicle and sweeps toward the end of the interior lighting device facing the rear of the motor vehicle, whereby the moving light begins at the respective door as soon as the moving light in the area of the dashboard has reached the lateral end of the interior lighting device.

In regard to the blinking hazard light being generated by the one or more interior lighting device(s), the control device can in an advantageous manner be configured so that the one or more interior lighting device(s) will be controlled in such a way that two moving lights are generated in the area of the motor vehicle's dashboard which start in the area behind the steering control element or in the area of the median longitudinal plane of the motor vehicle and move simultaneously apart from one another toward both long sides of the vehicle, two moving lights are generated in the interior roof area of the motor vehicle which start in the area of the median longitudinal plane of the motor vehicle and move simultaneously apart from one another toward both long sides of the vehicle, and/or a moving light is generated in the area of both the driver's door and the passenger's door such that the moving lights begin on the end of the interior lighting devices facing the front of the motor vehicle and move toward the end of the interior lighting devices facing the rear of the motor vehicle.

In regard to the blinking hazard light being generated by the one or more interior lighting device(s), the control device can also be configured so that the one or more interior lighting device(s) will be controlled in such a way that two moving lights are generated in the area of the motor vehicle's dashboard which start in the area behind the steering control element or in the area of the center of the median longitudinal plane of the motor vehicle and move simultaneously apart from one another toward both long sides of the vehicle, and a moving light is generated in the area of both the driver's door and the passenger's door such that the moving lights begin on the end of the interior lighting devices facing the front of the motor vehicle and move toward the end of the interior lighting devices facing the rear of the motor vehicle, whereby the moving lights on the doors begin as soon as the moving lights in the area of the dashboard have reached the lateral ends of the interior lighting device.

Additional advantages will result in regard to the motor vehicle if the control device is also configured such that data is received respecting the position of a backrest of at least one seat situated in the first (in the direction of travel) row of seats in the motor vehicle and, during the time a turn signal light or a blinking hazard light is being generated by the one or more flashing light devices, the one or more interior lighting device(s) will be controlled in such a way that until a first predeterminable angle is reached between the backrest of the at least one seat and the portion of the longitudinal axis of the motor vehicle oriented toward the front of the motor vehicle, a moving light is generated only in the area of the dashboard and/or in the area of the driver's door and/or the passenger's door, and after the backrest of the at least one seat has subsequently reached a second angle, which is greater than the first predeterminable angle, a moving light is generated on the interior roof of the motor vehicle instead of or in addition to the moving light in the area of the dashboard and/or in the area of the driver's door and/or the passenger's door.

The present invention also comprises a method for generating a moving light by using one or more interior lighting device(s) in the interior of a motor vehicle comprising the following steps:

providing, in a motor vehicle, one or more flashing light devices for generating a turn signal light or generating a blinking hazard light, one or more elongated interior lighting device(s) for emitting visible light in the form of a moving light in the interior of the motor vehicle, and a control device associated with the interior lighting device(s) for controlling the interior lighting device(s), whereby the control device is also configured to detect the generation of a turn signal light or a blinking hazard light by the one or more flashing light devices, the control device detecting that a turn signal light or a blinking hazard light is being generated by the one or more flashing light devices, and the control device controlling the one or more interior lighting device(s) in such a way that, during the time a turn signal light or a blinking hazard light is being generated by the one or more flashing light devices, visible light in the form of a moving light will be emitted by the one or more interior lighting device(s).

Also comprised by the present invention are refinements and embodiments of the method which are readily apparent to a skilled person from the motor vehicle claimed, the advantageous refinements and embodiments thereof, the drawing and the description thereof, and the claims.

The present invention will be explained in more detail by way of the accompanying illustration.

FIG. 1 shows a schematic and illustrative view of a portion of the motor vehicle interior according to an embodiment of the present invention.

The characterizations in FIG. 1 are purely schematic and are not to scale. Within FIG. 1, equal or similar elements are provided with the same reference signs.

The exemplary designs described hereinafter represent preferential embodiments of the present invention. Of course, the present invention is not restricted to these embodiments.

The features and combinations of features specified in the preceding description as well as in the description hereinafter of embodiments, examples of embodiments, and the description of FIG. 1 and/or the features and combinations of features shown in FIG. 1 are able to be used not only in the respective combination specified, but rather also in other combinations or in isolation without departing from the scope of the present invention.

Since FIG. 1 illustrates only a portion of the interior of a motor vehicle 1, FIG. 1 does not show a flashing light device for generating a turn signal light or a blinking hazard light on the exterior of the motor vehicle 1. The flashing light device can refer to a conventional flashing light device, in which a point-like blinking indicator light is generated by periodically switching on and off at least one conventional light bulb, halogen bulb, or LED. However, the flashing light device can also refer to one in which a moving light can be generated. Combinations of the various types of blinking indicator lights are also conceivable (for example, a point-like blinking indicator light in the front and a blinking indicator light that sweeps in the rear). In regard to the flashing light device, use can be made without any particular restrictions of all of the technical solutions known at this time or becoming known in the future used for both generating a point-like blinking indicator light or a blinking indicator light that sweeps.

Motor vehicles approved for use on public roads are provided with at least four flashing light devices, one each at the left front, the right front, the left rear, and the right rear. Furthermore, additional flashing light devices can also be provided, such as in the outer mirrors, in the side portions of the body, and/or in the roof area of the motor vehicle. The permissible locations and number of flashing light devices can be governed by regulations.

Flashing light device can be provided not only for emitting light intended to be perceived by road users located outside of the motor vehicle 1, but rather also by occupants of the motor vehicle. It is thus basically known that a flashing light device (which, in principle, is provided for emitting light that can be perceived by road users located outside of the motor vehicle 1, but which also emits some blinking light toward the front and the side) which is arranged in an exterior mirror 8, 8' of a motor vehicle will also emit blinking light from the extent of the exterior mirror 8, 8' that is oriented toward the rear of the motor vehicle 1 (for example, through an opening in the frame in which the end of a light guide is arranged). As a result, a driver who, for example, has activated the blinking indicator light on the left side of the motor vehicle 1 (to announce a change in the direction of travel toward the left) can recognize that the blinking indicator light on the left side of the motor vehicle 1 is active by looking at the left exterior mirror 8. This applies correspondingly to the right exterior mirror 8'.

This information (and the corresponding flashing light device) can no longer be made available in motor vehicles 1 in which at least one of the exterior mirrors 8, 8' has been replaced with at least one camera device. Since it is provided according to the invention that, during the time a turn signal light or a blinking hazard light is being generated by the one or more flashing light devices, the one or more interior lighting device(s) 2, 2', 2" will emit visible light in the form of a moving light, then this potentially lacking information will be entirely replaced by the moving light (the swiping movement) in the interior of the motor vehicle 1.

Against this background, let it be expressly stated that the motor vehicle 1 according to the present invention also includes vehicles in which at least one of the exterior mirrors 8, 8' has been replaced by at least one camera device, and the method according to the present invention is also able to be carried out in motor vehicles 1 of this kind.

As is schematically and illustratively shown in FIG. 1, the motor vehicle 1 comprises one or more elongated interior lighting device(s) 2, 2', 2" for emitting visible light in the interior of the motor vehicle 1. Elongated interior lighting devices are already known from the prior art and are frequently used for ambient illumination ("ambient lighting") or for marking specific areas (a "marker light").

Said interior lighting devices frequently comprise an elongated light guide body, into which light can be emitted or rather coupled by using one or more light sources. If a variety of colors of light are to be realized in this context, then either different sources of light can be used, each of which emits the desired color of light into the light guide body (e.g., different LEDs), or one or more sources of light can be used, each of which is able to emit multiple colors of light, as is the case with RGB LEDs, for example.

If light is radiated into an elongated light guide body in such a way that the light moves along inside the light guide body while being completely reflected by the walls of the light guide body, then suitable light decoupling elements or structures could be provided in order to enable light to be decoupled through the walls of the light guide body and, optionally, to enable the most consistent light intensity possible along the light guide body. The light guide body of interior lighting devices of this kind can, for example, be at least partially enclosed or covered by a diffuse material. The interior lighting devices can emit light either directly or indirectly in the interior of the motor vehicle.

For the purposes of the present invention, all elongated interior lighting device(s) known at this time from the prior art or becoming known in the future can be used without any restriction in particular for emitting visible light in the interior of the motor vehicle 1 (hence in particular also the aforementioned ambient lighting and marker lighting) with the proviso that they are at least also configured to be able to emit visible light (meaning light having a wavelength in the range of approximately 380 nm to 780 nm) in the form of a moving light.

As previously mentioned in the introductory portion, a number of technical solutions for generating a moving light are already known from the prior art and, for the purposes of the present invention, all technical solutions known from the prior art or becoming known in the future can be used for generating a moving light in the interior lighting device(s) 2, 2', 2" without any restrictions in particular.

The interior lighting device(s) 2, 2', 2" according to the present invention can be arranged in any suitable location in the interior of the motor vehicle 1. However, since the purpose of the interior lighting device(s) 2, 2', 2" is for the driver of the motor vehicle 1 in particular to reliably be able to perceive the moving light emitted therefrom, the interior lighting device(s) 2, 2', 2" is/are preferably arranged in the interior of the motor vehicle 1 such that they are located within the field of view of a driver sitting in the driver's seat.

Against this background, it is advantageous for the interior lighting device(s) 2, 2', 2" to be arranged in the area of the dashboard 3, the inside of the driver's door 4 and the passenger's door 4', and/or the interior roof 6 of the motor vehicle 1 where it joins the windshield 5.

In this context, the chosen orientation of the interior lighting device(s) 2, 2', 2" is preferably such that the moving light(s) generated thereby moves (periodically) in an essentially horizontal direction. In this context, "in an essentially horizontal direction" is understood to mean that, regarded from the natural perspective of the driver, the moving light moves horizontally toward the right, toward the left, forward and/or rearward whereby, in terms of the present invention, a deviation of up to about 20° from horizontal is included in the term "horizontal direction."

As is indicated in FIG. 1, the interior lighting device(s) 2, 2', 2" can have a linear or also a slightly curved shape.

If the interior lighting devices 2' are arranged in the inside area of the driver's door 4 and the passenger's door 4', then it can be provided that the interior lighting devices 2' extend from the ends of the doors 4, 4' facing the front of the motor vehicle 1 to the ends of the doors 4, 4' facing the rear of the motor vehicle 1. In this context, the term "end" is not understood in the literal sense, meaning that the interior lighting device(s) 2' may begin at some distance (e.g., several millimeters or centimeters) from the ends of the doors 4, 4' facing the front of the motor vehicle 1 and end at some distance (e.g., several millimeters or centimeters) from the ends of the doors 4, 4' facing the rear of the motor vehicle 1.

Since the ends of the doors 4, 4' facing the rear of the motor vehicle 1 are frequently not visible to a driver sitting in the driver's seat, it can likewise be provided that the interior lighting device(s) 2' only extend across about half the breadth of the door or across about two-thirds of the breadth of the door from the ends of the doors 4, 4' facing the front of the motor vehicle 1.

The motor vehicle 1 furthermore comprises a control device—not illustrated in FIG. 1—which is configured to detect the generation by the flashing light device of a turn signal light or a blinking hazard light. This control device can refer to any suitable control device, and it can, for example, be a component or components of the blinking light indicator device(s) or a separate unit.

The control device is furthermore configured to control the interior lighting device(s) 2, 2', 2" in such a way that, during the time a turn signal light or a blinking hazard light is being generated by the flashing light device, the interior lighting device(s) 2, 2', 2" will emit visible light in the form of a (periodic) moving light or moving lights.

Since it is known to skilled persons how an appropriate control device may be built in order to implement the aforementioned functions, it is not necessary to go into this in more detail in the present application.

As previously mentioned, the present invention is of particular advantage when autonomous driving (self-driving) of the motor vehicle 1 is being performed. During autonomous driving or self-driving, systems on board the vehicle assume the driving tasks of the driver, and the motor vehicle 1 moves in a fully automated manner. It is necessary for this purpose that the motor vehicle 1 comprise device for driving the motor vehicle 1 autonomously, such as sensors for sensing the environment of the motor vehicle 1, an automatically controlled drive system, automatically controlled steering, an automatically controlled brake system, a device for Car2Car or Car2x communication, and automatic route guidance by using a (satellite-based) navigation system, etc.

The autonomous driving (self-driving) condition can be signaled by at least one on-board device (such as an on-board digital computing device configured for this purpose) such that the control device according to the present invention is readily able to detect, for example, whether the motor vehicle 1 is being driven in an autonomous mode.

According to a preferential embodiment of the invention, it can be provided that the control device is configured such that, during the time a turn signal light or a blinking hazard light is being generated by the one or more flashing light devices, the one or more interior lighting device(s) 2, 2', 2" will be controlled in such a way as to emit visible light in the form of a moving light or moving lights only when the motor vehicle 1 is being driven in an autonomous mode.

The reason for this—as already mentioned above—is that, while a motor vehicle 1 is being driven autonomously, a driver is relieved of driving duties and is therefore able to observe the environment around the motor vehicle 1, read, or play games. In such a situation, in contrast to a non-autonomous driving situation, in which the driver personally switches on a turn signal light or a blinking hazard light while also actively and consciously participating in the driving situation, it is of particular advantage for the driver—as well as the other occupants of the motor vehicle 1—to, in order to avoid unpleasant feelings of surprise or even insecurity, be provided with an easily visible visual signal with respect to an imminent change in travel direction or an internal or external problem.

Consequently, a moving light or moving lights is/are of particular advantage during autonomous driving of a motor vehicle 1 because said lights or lights normally have a greater length than, for example, those of known conventional blinking indicator lights in the interior of the motor vehicle 1. Conventional blinking indicator lights, which are frequently arranged in the area of the instrument cluster behind the steering control element 7, could during autonomous driving of a motor vehicle 1 be concealed by, for example, a book held by the driver, a newspaper or magazine held by the driver, or a tablet computer held by the driver and—in contrast to a moving light or moving lights having a larger area—might not be perceived by the driver.

However, let it be noted that the present invention is of course not restricted to use in a motor vehicle which is being driven in an autonomous driving mode, meaning that the present invention is of course also able to be used when the motor vehicle is being driven in a manual, non-autonomous driving mode. An additional reason for this is that a user (customer) must first become accustomed to a moving light (the new light source), which is unusual to them, and must become familiar with the information that is being conveyed by it. Consequently, it is advantageous for a customer to have already been confronted with and become accustomed to the moving light before the motor vehicle begins moving under autonomous control.

In order for occupants of the motor vehicle 1 to quite easily associate a moving light or moving lights with the information conveyed thereby, it can advantageously be provided that the interior lighting device(s) 2, 2', 2" each emit a moving light in the interior of the motor vehicle 1 which corresponds (at least approximately) to the color being emitted externally by the one or more flashing light devices. It can thus be provided that, if the blinking light device(s) are externally emitting a turn signal light or blinking hazard light which is yellow in color, then moving light(s) in the interior of the motor vehicle 1 will have the same or a similar yellow color.

However, it can also be provided for moving light(s) in the interior of the motor vehicle 1 to have a color that is different from the color being emitted externally. For example, in the case of a yellow blinking hazard light, it is thus frequently provided that a blinking hazard light switch in the interior of the motor vehicle 1 emits red light when the blinking hazard light is switched on.

Against this background, it can according to the invention be provided that, for example, the interior lighting device(s) 2, 2', 2" will emit moving light(s) having a red color when the (yellow) blinking hazard light is switched on. An embodiment of this kind is also advantageous because a light having a red color is perceived as a "warning color."

As previously mentioned, a variety of colors of light can be realized using the interior lighting device(s) 2, 2', 2", for instance by using different sources of light (light generation devices), each of which emits the desired color of light, or by using one or more sources of light, each of which is each able to emit multiple colors of light, for example by using RGB LEDs.

There is no particular restriction on the color(s) of light with which the moving light illuminates or on the number of colors of light possible in the moving light. For instance, it can be provided that the moving light is able to illuminate with every color of light which is able to be generated by using an RGB LED. It can in this context be provided that the moving light illuminates with only a single color during the time when a turn signal light or a blinking hazard light is being generated by the one or more flashing light devices, or provided that, during this time, the color of light changes at predeterminable time intervals, abruptly or continuously, and one time or more times.

According to the invention, there is no particular restriction on the type of moving light used (e.g., the direction(s) of move thereof, the move rate(s) thereof, the periodicity thereof, and the physical appearance thereof), and all types of moving lights that are known (see, for example, the introductory part of the description and the prior art referred to) or become known in the future can be used for the present invention. In this respect, however, it is advantageous for the type(s) of moving light(s) to enable one to easily associate the moving light(s) with the information conveyed thereby.

For example, when using a turn signal light to indicate a change in travel direction toward the right, it is advantageous for the moving light in the interior of the motor vehicle 1 to move toward the right, and/or for the moving light in the vehicle's right front door 4 to move from front to back. The same applies in corresponding fashion to a turn signal light being used to indicate a change in travel direction toward the left.

In addition, regarding a blinking hazard light for which a blinking light device on the front right, the front left, the rear right, and the rear left of the motor vehicle 1 emits a moving light, it is advantageous for the moving light in the interior of the motor vehicle 1 to simultaneously move both toward the right and toward the left and/or simultaneously move on both of the vehicle's front doors 4, 4'. Another reason for doing so is to provide a clear contrast to the scenario with a turn signal light.

Likewise, in terms of easily associating the moving light(s) with the information conveyed thereby, it is advantageous in case moving light(s) is/are provided in the area of the dashboard 3 or the interior roof 6 of the motor vehicle 1 for each of them to begin in the approximate middle and move outward, toward the long sides of the vehicle. In terms of the present invention, "the approximate middle" is understood to mean the area between the median longitudinal plane of the motor vehicle 1 and the area behind the steering control element 7 even if, in normal vehicles (i.e., those having two or more seats in the first row), the latter area is frequently apart from the median longitudinal plane of the motor vehicle.

In order to provide two moving lights, which have an equal rate of move and are emitting from the area of the dashboard 3 or the interior roof 6, with a symmetrical appearance, it is advantageous for the moving lights to begin at the median longitudinal plane of the motor vehicle 1 and for the chosen length of the interior lighting device(s) 2, 2" in the interior to be symmetrical (mirror-symmetrical in particular) with respect to the median longitudinal plane.

In regard to interior lighting devices 2' in the area of the vehicle's front doors 4, 4', these can have an identical shape and length and be arranged on their respective doors 4, 4' in the same manner (e.g., in relation to position and orientation).

Additional embodiments relate-to several preferable examples of the move of the moving lights in the case of a turn signal light and a blinking hazard light. However, let it be expressly stated that the present invention is not restricted to these examples.

In the additional embodiments, given an appropriately chosen arrangement and length of the interior lighting device(s) 2, 2' in the area of the dashboard 3 and the vehicle's front doors 4, 4', a moving light or moving lights is/are generated to move without interruption from the area of the dashboard 3 and along into the vehicle's front doors 4, 4'. As a result, a moving light or moving lights of sufficient length having the greatest likelihood of being perceived by an occupant (in particular also the driver) of the motor vehicle 1 can be realized.

In case the motor vehicle 1 is being driven autonomously (self-driving), it cannot be ruled out that a driver will not move the backrest of their seat into a lying or a near-lying position in order to rest or relax during autonomous (self-) driving mode.

Against this background—and as is provided according to an advantageous embodiment of the motor vehicle 1—it is advantageous for the control device also to be configured such that data is received respecting the position of a backrest of at least one seat situated in the first (in the direction of travel) row of seats in the motor vehicle 1 and, during the time a turn signal light or a blinking hazard light is being generated by the one or more flashing light devices, the one or more interior lighting device(s) 2, 2', 2" will be controlled in such a way that until a first predeterminable angle is reached between the backrest of the at least one seat and the portion of the longitudinal axis of the motor vehicle 1 oriented toward the front of the motor vehicle 1, a moving light or moving lights will be generated only in the area of the dashboard 3 and/or in the area of the driver's door 4 and/or the passenger's door 4', and after the backrest of the at least one seat has subsequently reached a second angle, which is greater than the first predeterminable angle, a moving light or moving lights will be generated on the interior roof 6 of the motor vehicle 1 instead of or in addition to the moving light in the area of the dashboard 3 and/or in the area of the driver's door 4 and/or the passenger's door 4'.

In this context, a first angle can be predetermined as, for example, 100°, 105°, 110°, 115°, 120°, 125°, or 130°. Within a range of from 100° to about 130°, the orientation of the seatback is relatively vertical, and it can be assumed that the dashboard 3 and/or the area beneath the windows of the vehicle's front doors 4, 4' will still be located within the field of view (or possibly at the edge of the field of view) of an occupant of the motor vehicle 1 who is "looking straight ahead" (meaning an occupant whose back is against the seatback and whose head is not tilted with respect to their cervical spine). In such a case, it can be sufficient for a moving light or moving lights to only be generated in the area of the dashboard 3 and/or in the area of the driver's door 4 and/or the passenger's door 4' since said moving light(s) will still be able to be reliably perceived.

Given an angle of the seatback that is greater than the first predeterminable angle (meaning, for example, greater than 130°, hence a relatively flat orientation of the seatback, it must on the contrary be assumed that the dashboard 3 and/or the area beneath the windows of the vehicle's front doors 4, 4' will no longer be located within the field of view of an occupant of the motor vehicle 1 who is "looking straight ahead." In such a case, it is therefore advantageous if, in addition to or instead of the moving light(s) in the area of the dashboard 3 and/or in the area of the driver's door 4 and/or the passenger's door 4', a moving light or moving lights is/are generated on the interior roof 6 of the motor vehicle 1 in order to ensure that the moving light(s) is/are also able to be reliably perceived by an occupant "in a resting position."

As far as in the present application, it is said that a moving light or moving lights being generated "during the time" a turn signal light or a blinking hazard light is being generated, the duration of the moving light or moving lights (meaning the period of time during which a moving light is visible) is either as long as the period of time within which a turn signal light is being generated or shorter. Advantageously, the moving light or moving lights will in any event, however, begin with the generation of a turn signal light or a blinking hazard light. For example, it can in the case of generating a turn signal light or a blinking hazard light be provided that a moving light or moving lights is/are generated in the interior no more than several times (approximately two or three times) even if the turn signal light or the blinking hazard light in the motor vehicle remains active.

The moving light(s) can be generated in addition to or instead of conventional blinking indicator lights (such as in the area of the instrument cluster or the blinking hazard light switch). Also included in the present invention is the generation of another perceivable signal in the interior of the motor vehicle during the generation of moving light(s), for example an acoustic signal or a signal that can be perceived via haptic means (such as by using vibrating the steering control element or the area of the seat or seats).

The invention claimed is:

1. A motor vehicle comprising:
one or more flashing light devices configured to generate a turn signal light or generate a blinking hazard light;
one or more elongated interior lighting devices configured to emit visible light in a form of moving light in an interior of the motor vehicle; and
a control device associated with the one or more interior lighting devices configured to:
detect the generation of the turn signal light or the generation of the blinking hazard light, and
control the one or more interior lighting devices to emit visible light in the form of moving light during a time that the turn signal light is being generated or during a time that the blinking hazard light is being generated, and when the motor vehicle is being driven in an autonomous mode.

2. The motor vehicle of claim 1, wherein the one or more interior lighting devices are configured to emit the moving light having at least a yellow and/or a red color.

3. The motor vehicle of claim 1, wherein the one or more interior lighting devices are arranged in an area of a dashboard, inside a driver's door area, inside a passenger's door area, and/or inside an interior roof area of the motor vehicle where it joins a windshield.

4. The motor vehicle of claim 3, wherein during the time that the turn signal light is being generated, the one or more interior lighting devices are configured to:
generate the moving light in the area of the dashboard which starts in a first area behind a steering control element or a second area of a median longitudinal plane of the motor vehicle, and runs toward a side of the motor vehicle where the generated turn signal light indicates.

5. The motor vehicle of claim 4, wherein during the time that the turn signal light is being generated, the one or more interior lighting devices are further configured to:
generate the moving light in the interior roof area which starts in an area of the median longitudinal plane of the motor vehicle and runs toward the side of the motor vehicle where the generated turn signal light indicates.

6. The motor vehicle of claim 5, wherein during the time that the turn signal light is being generated, the one or more interior lighting devices are further configured to:
generate the moving light in the driver's door area or the passenger's door area depending on the side of the motor vehicle where the generated turn signal light indicates, wherein the moving light begins on a first end of the interior lighting device facing a front of the motor vehicle and runs toward a second end of the interior lighting device facing a rear of the motor vehicle.

7. The motor vehicle of claim 4, wherein during the time that the turn signal light is being generated, the one or more interior lighting devices are further configured to:
generate the moving light in the driver's door area or the passenger's door area depending on the side of the motor vehicle where the generated turn signal light indicates, wherein the moving light begins on a first end of the interior lighting device facing a front of the motor vehicle and runs toward a second end of the interior lighting device facing a rear of the motor vehicle.

8. The motor vehicle of claim 7, wherein the one or more interior lighting devices are configured to:
generate the moving light in the driver's door area or the passenger's door area as soon as the moving light in the area of the dashboard reaches the side of the motor vehicle where the generated turn signal light indicates.

9. The motor vehicle of claim 3, wherein during the time that the turn signal light is being generated, the one or more interior lighting devices are configured to:
generate the moving light in the interior roof area which starts in an area of a median longitudinal plane of the motor vehicle and runs toward a side of the motor vehicle where the generated turn signal light indicates.

10. The motor vehicle of claim 9, wherein during the time that the turn signal light is being generated, the one or more interior lighting devices are further configured to:
generate the moving light in the driver's door area or the passenger's door area depending on the side of the motor vehicle where the generated turn signal light indicates, wherein the moving light begins on a first end of the interior lighting device facing a front of the motor vehicle and runs toward a second end of the interior lighting device facing a rear of the motor vehicle.

11. The motor vehicle of claim 3, wherein during the time that the turn signal light is being generated, the one or more interior lighting devices are configured to:
generate the moving light in the driver's door area or the passenger's door area depending on a side of the motor vehicle where the generated turn signal light indicates, wherein the moving light begins on a first end of the interior lighting device facing a front of the motor vehicle and runs toward a second end of the interior lighting device facing a rear of the motor vehicle.

12. The motor vehicle of claim 3, wherein during the time that the blinking hazard light is being generated, the one or more interior lighting devices are configured to:
generate two moving lights in the area of the dashboard which start in a first area behind a steering control element or a second area of a median longitudinal plane of the motor vehicle, and run simultaneously apart from one another toward both lateral sides of the motor vehicle.

13. The motor vehicle of claim 12, wherein during the time that the blinking hazard light is being generated, the one or more interior lighting devices are further configured to:
generate two moving lights in the interior roof area which start in an area of the median longitudinal plane of the motor vehicle and run simultaneously apart from one another toward both lateral sides of the motor vehicle.

14. The motor vehicle of claim 12, wherein during the time that the blinking hazard light is being generated, the one or more interior lighting devices are further configured to:
generate two moving lights both in the driver's door area and the passenger's door area, wherein the two moving lights begin on a first end of the interior lighting device facing a front of the motor vehicle and run toward a second end of the interior lighting device facing a rear of the motor vehicle.

15. The motor vehicle of claim 14, wherein the one or more interior lighting devices are configured to:
generate the two moving lights in the driver's door area and the passenger's door area as soon as the two moving lights in the area of the dashboard reach the lateral sides of the motor vehicle.

16. The motor vehicle of claim 3, wherein during the time that the blinking hazard light is being generated, the one or more interior lighting devices are configured to:

generate two moving lights in the interior roof area which start in an area of a median longitudinal plane of the motor vehicle and run simultaneously apart from one another toward both lateral sides of the motor vehicle.

17. The motor vehicle of claim 16, wherein during the time that the blinking hazard light is being generated, the one or more interior lighting devices are further configured to:
generate two moving lights both in the driver's door area and the passenger's door area, wherein the two moving lights begin on a first end of the interior lighting device facing a front of the motor vehicle and run toward a second end of the interior lighting device facing a rear of the motor vehicle.

18. The motor vehicle of claim 3, wherein during the time that the blinking hazard light is being generated, the one or more interior lighting devices are configured to:
generate two moving lights both in the driver's door area and the passenger's door area, wherein the two moving lights begin on a first end of the interior lighting device facing a front of the motor vehicle and run toward a second end of the interior lighting device facing a rear of the motor vehicle.

19. The motor vehicle of claim 3, wherein the control device is configured to:
receive data about a position of a backrest of at least one seat situated in a first row of seats in the motor vehicle; and
control the one or more interior lighting devices to:
generate one or more moving lights in the area of the dashboard, and/or the driver's door area, and/or the passenger's door area, when a first predetermined angle is reached between the backrest of the at least one seat and a portion of the longitudinal axis of the motor vehicle oriented toward the front of the motor vehicle, and
generate one or more moving lights in the area of the interior roof area, after a second angle is reached between the backrest of the at least one seat and the portion of the longitudinal axis of the motor vehicle oriented toward the front of the motor vehicle, wherein the second angle is greater than the first predetermined angle.

20. A method for generating a moving light in an interior of a motor vehicle, comprising:
generating, by one or more flashing light devices, a turn signal light or a blinking hazard light;
emitting visible light, by one or more interior lighting devices, in a form of moving light in the interior of the motor vehicle; and
controlling, by a control device, the one or more interior lighting devices to emit visible light in the form of moving light by detecting the generation of the turn signal light or the blinking hazard light, when the motor vehicle is driven in an autonomous mode.

* * * * *